Patented Feb. 2, 1954

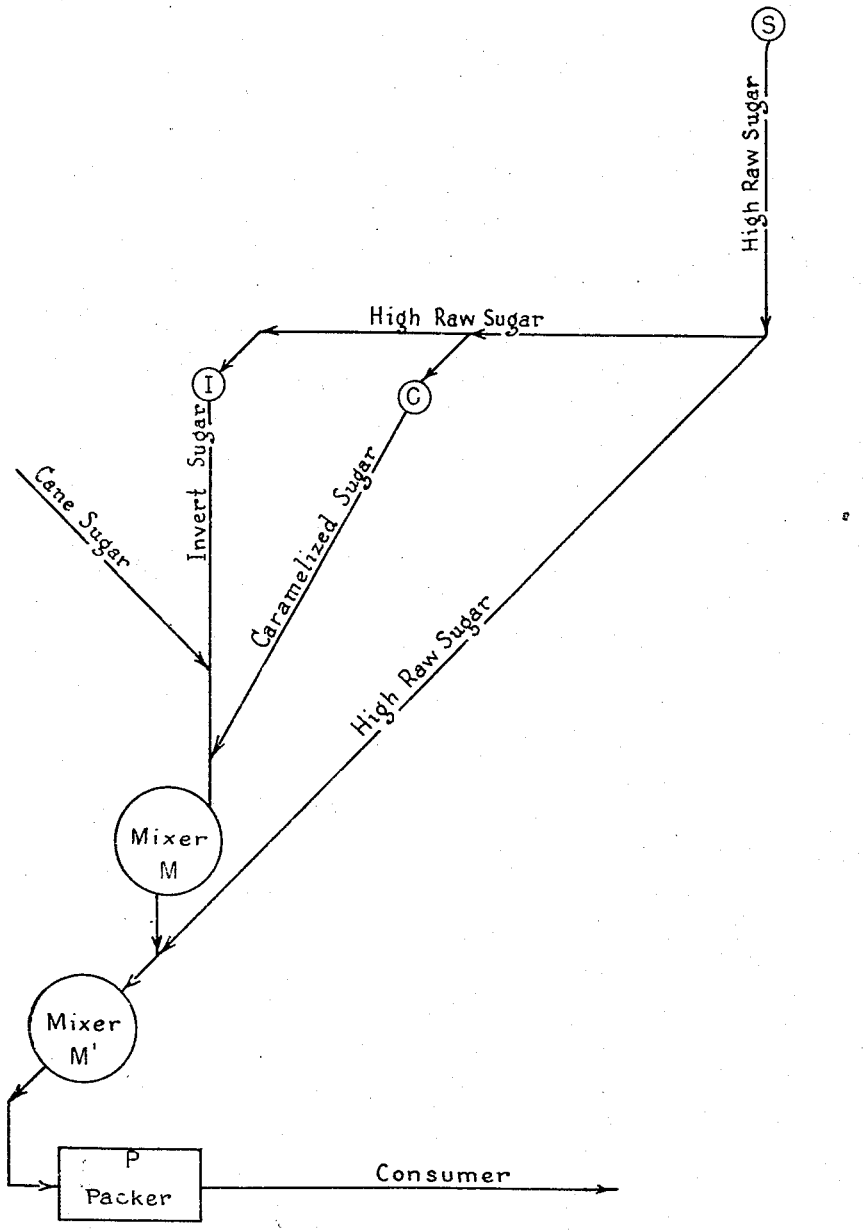

2,668,128

UNITED STATES PATENT OFFICE 2,668,128

PROCESS OF PRODUCING BROWN SUGAR

Benjamin A. Oxnard and Chesney H. Criswell, Denver, and Arnold J. Thomas, Johnstown, Colo., assignors to The Great Western Sugar Company, a corporation of New Jersey Application October 19, 1949, Serial No. 122,302

4 Claims. (Cl. 127—30)

The invention relates to the art of producing brown sugar. In the past, most commercial brown sugars have been produced from cane sugar sources, although some attempts have been made to produce a satisfactory grade of brown sugar from beet sugar. However, such beet sugars have not satisfied requirements of the market from the standpoint of color, grade, or consistency.

It is an object of the present invention to provide a simple, efficient and economical process for the production of brown sugar of a soft, fine-grained character.

Another object of this invention is to provide a brown sugar of fine-grained, soft consistency particularly suited for packaging in moisture-proof containers in which it may be maintained without caking or substantial loss of its granular consistency.

A further object of this invention is to provide sufficient variation in processing procedure to permit selective production of light, medium or dark brown sugar.

The present invention is based on the discovery that by using either beet or cane sugar, but preferably refined white sugar or raw sugar of beet sugar refining as the sugar source of the brown sugar composition and blending the several ingredients to be mixed with such sugar before mixing with the sugar source, a highly satisfactory brown sugar is obtained.

Brown sugar produced by the present process will contain the hereinafter enumerated ingredients in the approximate proportions shown in this tabulation:

| | Percent |
|---|---|
| Raw or refined white sugar | 82–91 |
| Cane flavored syrup | 6–11 |
| Inverted white or inverted high raw sugar | 2.5–5 |
| Caramelized white or raw sugar | 0.3–1.5 |

The practice of the present invention will be best understood by reference to the accompanying flow sheet illustrating a preferred processing procedure. In the operation depicted, a sugar of sugar refining and designated as the high raw sugar of beet sugar refining is delivered from a suitable supply source S to a caramelizing kettle C. Preferably, this kettle will be stainless steel, using steam as the heating medium, and the extent of caramelization is controlled by the steam pressure on the kettle, or the temperature and length of time caramelization is carried on. Usually a heating interval of 60–180 minutes at a temperature of approximately 160°–180° C. will give satisfactory results.

Raw sugar from source S also is conducted to another kettle I for the production of invert sugar. This kettle also should preferably be of stainless steel composition, with temperature controlled and a small quantity of phosphoric acid ($H_3PO_4$) used in the treatment. Any excess phosphoric acid will be neutralized by soda ash or by the natural alkalinity of the syrups when the mixture is blended.

The caramelized sugar and invert sugar thus produced are blended in proper proportion with a cane flavored syrup, which preferably is a specially selected refining syrup preferably a water solution of cane sugar, in a mixing apparatus M equipped with a heat source, such as heating coils. Variations are permissible at this stage, particularly with respect to the rate of mixing. However a minimum treatment interval of 30 minutes at a temperature of 60–80° C. will give satisfactory results.

The discharge of mixer M after proper blending of the ingredients is weighed and mixed with weighed amounts of raw sugar from source S in a second mixing apparatus M' until the constituents are thoroughly blended. Usually a mixing interval of 1 to 10 minutes with the ingredients maintained at a temperature of 10–40° C. will be adequate for this purpose. The final discharge of this blending operation is the soft, fine-grained brown sugar previously described, and is in proper condition for packaging.

Consequently, the discharge of mixer M' is delivered to a packer P where it is deposited in weighed amounts in suitable packages or containers, after which it is ready for storage or delivery to consumers. Sugar produced in the manner just described has the fine-grained, soft consistency previously described, and may be produced as light, medium or dark grade by variations in the quantity or character of the coloring composition which includes the syrup introduced into the treatment, or caramelized and invert sugars used in the blending.

Commercial brown sugars now produced for the United States market have the following approximate analysis:

| | |
|---|---|
| Sucrose | percent 92 |
| Invert sugar | do 4 |
| Moisture | do 3 |
| Polarization | do 92 |

While sugar produced in accordance with the present invention will vary in composition as previously noted, such brown sugar will have the following analysis:

| | Percent |
|---|---|
| Polarization | 88 to 94 |
| Invert sugar | 2.5 to 5 |
| Moisture content | 2 to 4 |
| Ash content | 0.2 to 0.6 |

In contradistinction to former practice, the variations in content of the brown sugar produced by the practice of the present invention are made at the mixer M and the blended sugar mixture thus produced is blended with the raw sugar content in the same manner, irrespective of such variations.

In the preceding description, reference has been made to raw sugar as the product delivered through the respective treatment stages from source S. It should be understood that other materials also may be used for this purpose, such as granulated beet or cane sugar. In particular, a specially refined white sugar obtained from the Johnstown plant of The Great Western Sugar Company and known commercially as Johnstown sugar is well suited for this purpose, due to the character and softness of its grain.

Since both the aforementioned specially refined sugar and the usual raw sugar of beet sugar refineries are refined white beet sugar, the term "refined white beet sugar" has been used in this specification as generic to such compositions, or any other compositions of corresponding source and properties. Similarly, the expression "granulated white sugar" is intended to include sugar derived from either cane or beet sources.

In the flow sheet operation high raw sugar has been indicated as the source material. While this sugar is well suited for use in the process, particularly where this process is to be performed in beet sugar refineries, it should be understood that any refined white sugar of beet sugar refining will be well suited for use as the source material. Likewise when fineness of grain is a desideratum of the operation, refined white sugars of fine grain characteristic such as the Johnstown sugar previously described will be highly satisfactory when used as the source material. Further if control of grain size is not too important in the treatment, any granulated white sugar such as cane sugar for example may be used with highly satisfactory results. To produce these various grades of sugar, the ingredients will have the approximate percentages by weight as follows:

| | Per cent |
|---|---|
| High raw or refined white sugar | 82–91 |
| Cane flavored syrups | 6–11 |
| Invert white or high raw sugar | 2.5–5 |
| Caramelized high raw or white sugar | 0.3–1.5 |

Therefore the flow sheet is intended to represent a typical operation utilizing features of the present invention and it will be understood that various substitutions may be included in such an operation, all as particularly pointed out in the preceding description. Other changes and modifications may be availed of within the spirit and scope of the invention as set forth in the hereunto appended claims.

We claim:

1. A method of producing a brown sugar composition which comprises mixing an intimate blend of about 100 parts by weight of fine granulated white sucrose, 12 parts by weight of sugar cane syrup and 3 parts by weight of invert sugar and heat-drying while mixing until the moisture content of the mixture is reduced to about 2%.

2. The process of producing brown sugar from a granulated white sugar composition which comprises subjecting 0.3 to 1.5 per cent of high raw sugar to a heating process at approximately 160 to 180° C. for from one to three hours to produce caramelized sugar, subjecting an additional 2.5 to 5 per cent of high raw sugar to a heating process to produce invert sugar, premixing said caramelized and invert sugar with a 6 to 11 per cent of cane flavored syrup for at least thirty minutes at 60 to 80° C., and introducing said premixed products into 82 to 91 per cent high raw or refined white sugar for intermixture for from one to ten minutes at a temperature of from 10 to 40° C. to produce a brown sugar product.

3. A method of producing a brown sugar composition which comprises mixing an intimate blend of about 82–91% by weight of fine granulated white sucrose, about 6–11% by weight of cane flavored syrups, about 2.5–5% by weight of invert sugar, and heat drying while mixing until the moisture content of the mixture is reduced to about 2%.

4. A method according to claim 3 in which a coloring composition is added to the mixture prior to the heating-drying step.

BENJAMIN A. OXNARD.
CHESNEY H. CRISWELL.
ARNOLD J. THOMAS.

References Cited in the file of this patent

UNITED STATES PATENTS

| Number | Name | Date |
|---|---|---|
| 1,886,875 | Ehrhard et al. | Nov. 8, 1932 |

OTHER REFERENCES

Jacobs, Flavors—Preparation of Caramel, Amer. Perf. & Essential Oil Review, May 1947, pages 501, 503 and 505.

Fairrie, "Sugar," 1st ed., London, 1925, pages 108, 122 and 113.

McIntosh, "Tech. of Sugar," 3rd ed., 1916, pages 386 and 387.

Deerr, "Cane Sugar," 2nd ed., 1921, pages 428–433.